United States Patent [19]
Downing et al.

[11] Patent Number: 6,075,925
[45] Date of Patent: Jun. 13, 2000

[54] CONTROL PANEL FOR IMAGE FORMING DEVICES

[75] Inventors: Jacqueline V. Downing; Anthony G. Laidlaw, both of Boise; Stephen K. Johnson, Meridian; Marianne Savola; Marguerite L. Gulrich, both of Boise, all of Id.

[73] Assignee: Hewlett-Packard Company, Palo Alto, Calif.

[21] Appl. No.: 08/800,726

[22] Filed: Feb. 13, 1997

[51] Int. Cl.[7] ....................................................... B41B 15/00
[52] U.S. Cl. .............................. 395/101; 399/81; 345/326
[58] Field of Search .................................... 395/101, 109, 395/113, 112; 345/326, 341, 352, 353, 354; 399/81

[56] References Cited

U.S. PATENT DOCUMENTS

| | | | |
|---|---|---|---|
| 4,870,447 | 9/1989 | Yoshida et al. | 399/183 |
| 5,113,222 | 5/1992 | Wilson et al. | 399/81 |
| 5,509,107 | 4/1996 | Kojima | 395/113 |
| 5,532,792 | 7/1996 | Hattori | 399/76 |

*Primary Examiner*—Edward L. Coles
*Assistant Examiner*—Sterling W. Chandler

[57] ABSTRACT

In an image forming device, a control panel having an intuitive hierarchical layout including: three rocker type switches corresponding to a menu selector, an item selector and a value selector; a select push-button; a job cancel push-button; and a go button. Menu selector, item selector, value selector and select button are arranged in an intuitive hierarchical fashion with the selectors corresponding to higher level features and menus are placed higher in the control panel layout hierarchy than lower level selectors. The rocker type switches allow a user to proceed through menus and items within the menus in both forward and backward directions. The separate go button as well as the separate job cancel button are provided to allow independent selection of those features.

26 Claims, 6 Drawing Sheets

Fig. 1

Prior Art

CONTROL PANEL FOR IMAGE FORMING DEVICES

TECHNICAL FIELD OF THE INVENTION

This invention generally relates to controls for image forming devices. More particularly, this invention relates to a control panel configuration for an image forming device such as a laser printer to provide intuitive and convenient feature selection by a user for a large number of printing features.

Background Art

Image forming devices, such as laser printers, ink jet printers, facsimile machines and the like, are provided with more and more features as technology improves. The number of features has become so large that it has become both cumbersome and confusing for a user to select the desired features for one or more print jobs. Typically, an image forming device is provided with some sort of display panel, such as an LCD or LED display, and several push-button switches, each dedicated to a separate function. For example, the IBM Laser Printer E™ by Lexmark™ has five such push-buttons and a seven segment LED display along with several individual LED indicators. The first of the five buttons is a start/stop and code button, the second is a print/check and re-set button, the third is a paper source and size selector button, the fourth is a font source and position selector button, and the fifth is a paper orientation button for selecting between landscape and portrait printing. This particular printer represents somewhat older technology with the control panel only capable of controlling a relatively limited number of printing features.

Figure 1:
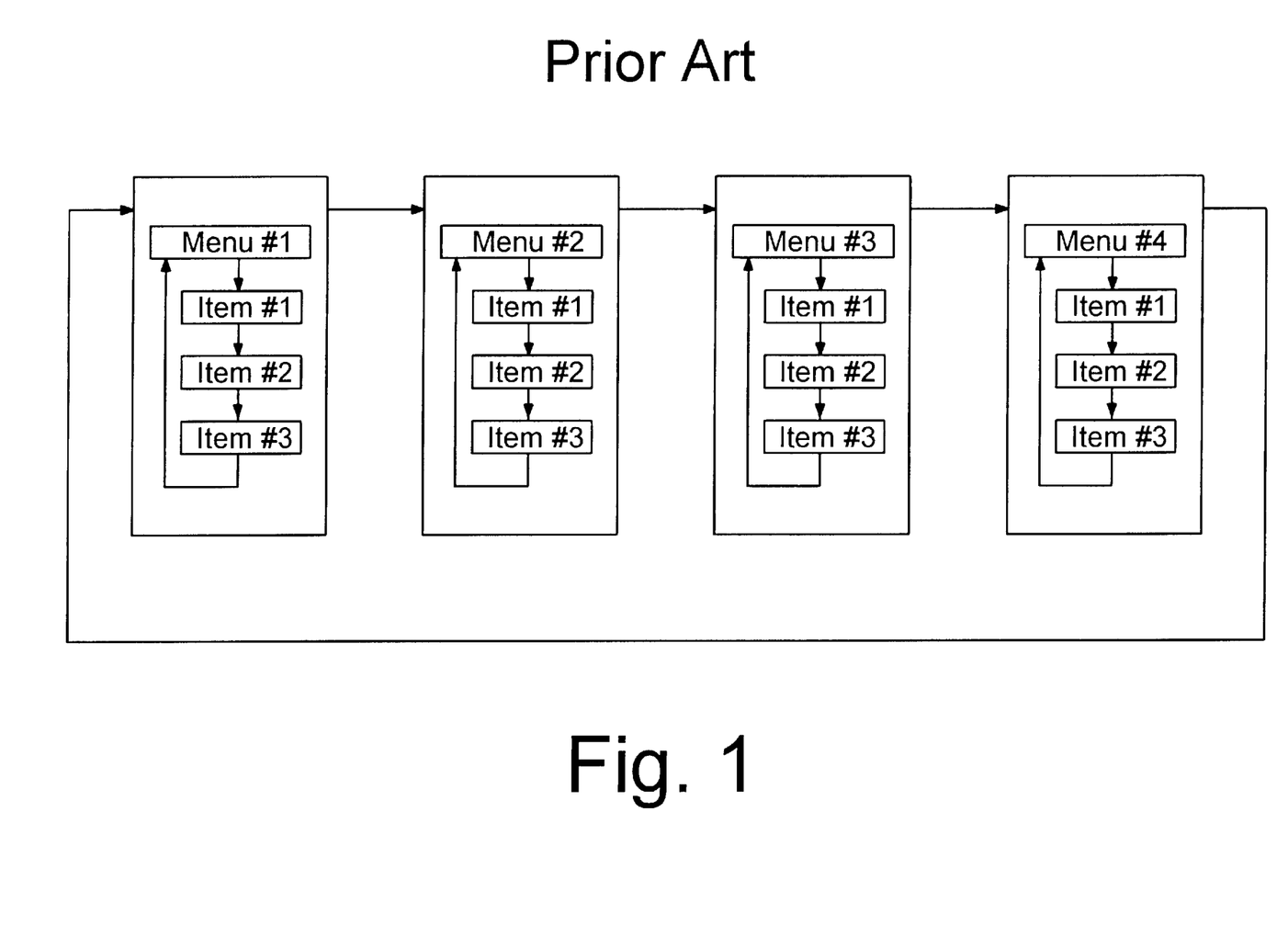
FIG. 1 is a flow diagram of one menu system typical of the prior art.
Figure 2:
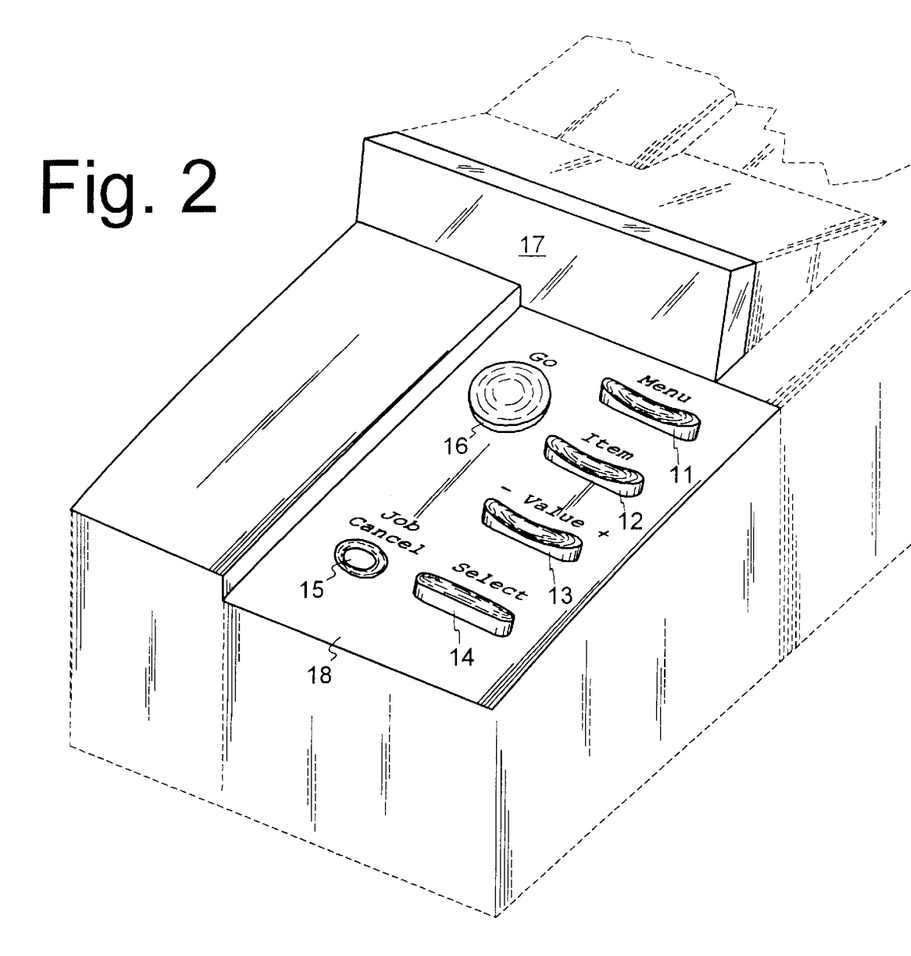
FIG. 2 is an elevation view of the control panel layout according to the invention.
Figure 3:
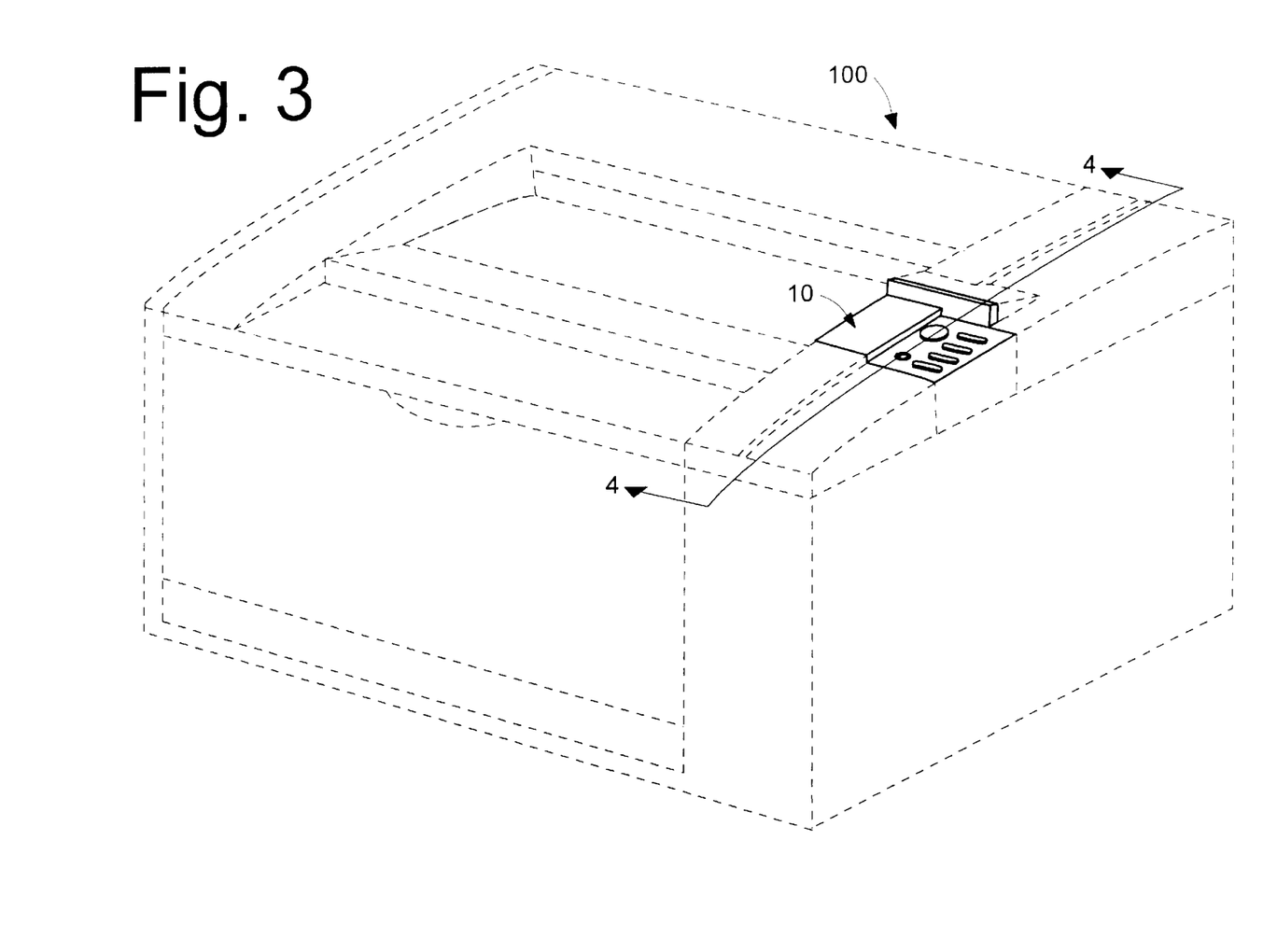
FIG. 3 is an elevation view of the control panel layout, according to the invention, incorporated into a laser printer image forming device.
Figure 4:
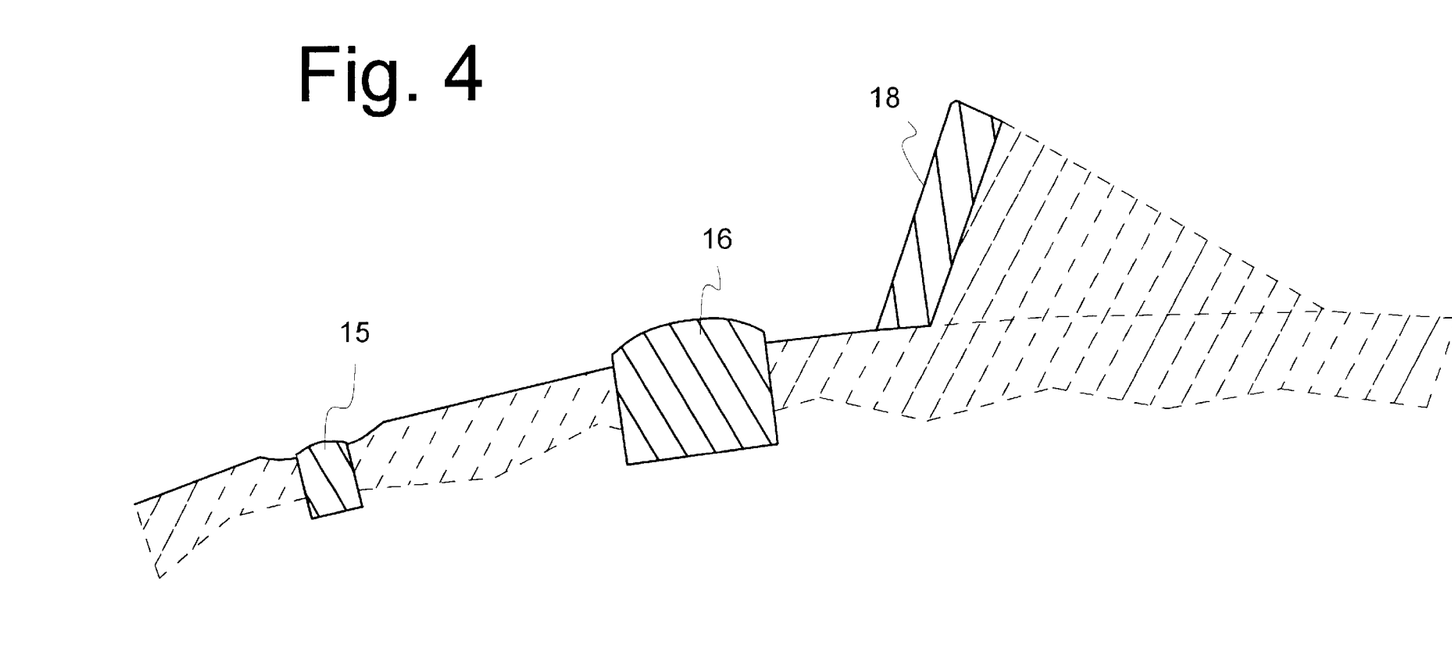
FIG. 4 is a partial side sectional view of the control panel taken along section line 4—4 of FIG. 3.

FIG. 1, labeled PRIOR ART, illustrates a printing feature menu hierarchy typical of the prior art. One of the primary problems with this structure is that it is essentially a one way path, i.e. in order to get to a different menu or item within the same level of the hierarchy, a user must cycle through all of the interceding menus or items. While this does not pose a problem if the desired menu or item happens to be the next one in the progression cycle, it does pose a problem, for example, when the user is currently at the last menu or item and desires to be at the second to the last menu or item. Or, another example is when the user is currently at the first menu and wants to be at the last menu. A similar problem exists anytime the users current position is more than halfway through the cycle away from the desired position.

Another example of somewhat newer technology is the Hewlett-Packard LaserJet 4 Plus® printer. The control panel for this printer has a larger alpha-numeric LED display in connection with eight separate push-buttons. The first button is an on-line/off-line button which toggles the printer between an on-line state in which it is ready to accept print jobs and an off-line state in which it is ready to accept feature selections from the user. The second, third and fourth buttons are the form feed, paper size and enter buttons respectively. The fifth button is a shift button which, when depressed, changes the functionality of the fifth, sixth and seventh buttons. The fifth button is the menu selection button when the shift key is not depressed and the reset button when the shift key is depressed. The sixth button is the item selection button when the shift key is not depressed, and the continue button when the shift key is depressed. The seventh button is the feature value increment button when the shift key is not depressed, and the feature value decrement button when the shift key is depressed.

A hypothetical example of how a user would change the default font pitch from twelve point font size to ten point font size on the Hewlett-Packard LaserJet 4 Plus® printer is as follows: 1) the on-line/off-line button is depressed to place the printer in an off-line state; 2) the menu key is depressed twice to select the PCL menu which is displayed on the alpha-numeric display; 3) the item key is depressed repeatedly until the "point size equals" command is displayed on the alpha-numeric display; 4) the decrement key is depressed repeatedly to decrement the existing twelve point font size until a ten is displayed on the alpha-numeric display; 5) the enter key is depressed to save the new font point size; and 6) the on-line key is depressed to place the printer in an on-line state and ready to receive print jobs.

As is often the case, a user will want to select or change the value of more than one feature at any given time. As mentioned earlier, one of the problems with the prior art control panels is that the menu and item selection functions are one way cycles in that the user must cycle through the entire list to advance to a desired menu or item within a given menu that is above the user's current position in the menu and item hierarchy. For instance, in the above hypothetical, if after setting the font point size the user wished to change the paper orientation from portrait to landscape, the user would prior to depressing the on-line button depress the menu button eight times to return to the printing menu from which the user could depress the item button three times to select the paper orientation feature. It would be desirable to be able to proceed more directly from the PCL menu to the printing menu without having to cycle through seven other menus. The same logic applies to selecting items within a particular menu which are higher in the hierarchy than the current position of the user.

An additional problem associated with prior art printers is related to the ability to cancel particular print jobs. As print jobs are sent to a printer to be printed, they are typically temporarily stored on a hard drive or other similar memory device and cataloged in a print queue. Individual print jobs within the print queue can be deleted via software only prior to their actually being sent to the print engine within the image forming device. In a network environment, the print queue or spooler may be located on one or more remote computers. There are occasions where an improperly formatted print job is sent to a printer resulting in numerous unusable pages of print, occasions when print jobs are sent in error and other occasions in which it is desirable to cancel a job currently being printed. Unfortunately, most of these occasions are only discovered by the user when they are standing at the printer watching untold numbers of pages of gibberish being printed. In order to cancel the print job, the user must push the button corresponding to the off-line button, return to the computer which has software control of the print queue to determine if the complete job has finished being sent and, if not, cancel the job from there, return to the printer and either turn the printer off to clear the printer's memory or return the printer on-line and let the printing finish printing the particular print job. Turning the printer off can result in other jobs being lost as well as significant time spent waiting for the printer to come back on-line. It would, therefore, be desirable to be able to cancel an individual job at the printer itself without having to take the printer off-line and having to return to the requesting computer.

DISCLOSURE OF THE INVENTION

These desires are satisfied, as well as other advantages realized, by a control panel layout having: three rocker type switches corresponding to a menu selector, an item selector and a value selector; an enter or select push-button; a job cancel push-button; and a go button. The menu selector, item selector, value selector and select button are arranged in an intuitive hierarchical fashion with the selectors corresponding to higher level features and menus placed higher in the control panel layout hierarchy than lower level selectors. A separate go button as well as a separate job cancel button are provided to allow independent selection of those features.

When activated, the menu selector automatically places the image forming device in the off-line programming state and allows a user to advance through the various menus in both forward and backward directions. The opposing ends of the menu selector rocker switch are provided with direction indicating indicia such as arrows or chevrons indicating the forward and backward directions.

Similarly, the item selector rocker switch allows a user to proceed in both forward and backward directions through the list of items within a selected menu. The opposing ends of the item selector rocker switch are also provided with direction indicating indicia to indicate the opposing directions through which the user can proceed.

The value selector allows the user to increment or decrement the value of a particular menu item. The opposing ends of the value selector rocker switch are provided with indicia indicating increment and decrement functions, such as a plus sign on one end and a minus sign on the other.

The selector switch or button is a momentary push-button switch in the preferred embodiment and allows a user to save a desired value in memory for any of the items within a particular menu. The go switch or button is also a momentary push-button switch in the preferred embodiment and allows a user to reenter the on-line state after having entered the programming state. The job cancel switch or button is, in the preferred embodiment, a momentary push-button switch which allows the user to cancel the current print job, stops printing and clears the print buffer(s) of data representing the canceled job. The job cancel selector is advantageously recessed within the control panel surface to inhibit inadvertent job cancellation. The separate on-line and select selectors (buttons) allow setting of multiple menu items or a direct return to the on-line state from the off-line programming state.

Circuitry is provided to detect activation of the switches, to track the states of the various registers, to update registers, to display the current state as well as the current selected item and/or menu on a connected alpha numeric display panel and to communicate with the formatter, controller and print engine of the image forming device. In addition, the circuitry includes an off-line time out timer which places the image forming device back in the on-line state after a preset lapse of time of inactivity in the off-line mode. This feature accounts for those instances in which a user may inadvertently forget to return the image forming device to the on-line state after entering the off-line state.

DETAILED DESCRIPTION OF THE INVENTION

Referring now to FIGS. 2 through 6, a preferred embodiment of a control panel layout according to the invention is illustrated in detail and generally designated as 10. Control panel 10 includes: three rocker type switches corresponding to a menu selector switch 11, an item selector switch 12 and a value selector switch 13; an enter or select push-button 14; a job cancel push-button 15; and a go button 16, all mounted within control panel support surface 18 which can form part of the housing for the image forming device. Menu selector switch 11, item selector switch 12, value selector switch 13 and select button 14 are arranged in an intuitive hierarchical fashion with the selectors corresponding to higher level features and menus placed higher in the control panel layout hierarchy than lower level selectors. The separate go button 16 and separate job cancel button 15 are provided to allow independent selection of those features.

Figure 5:
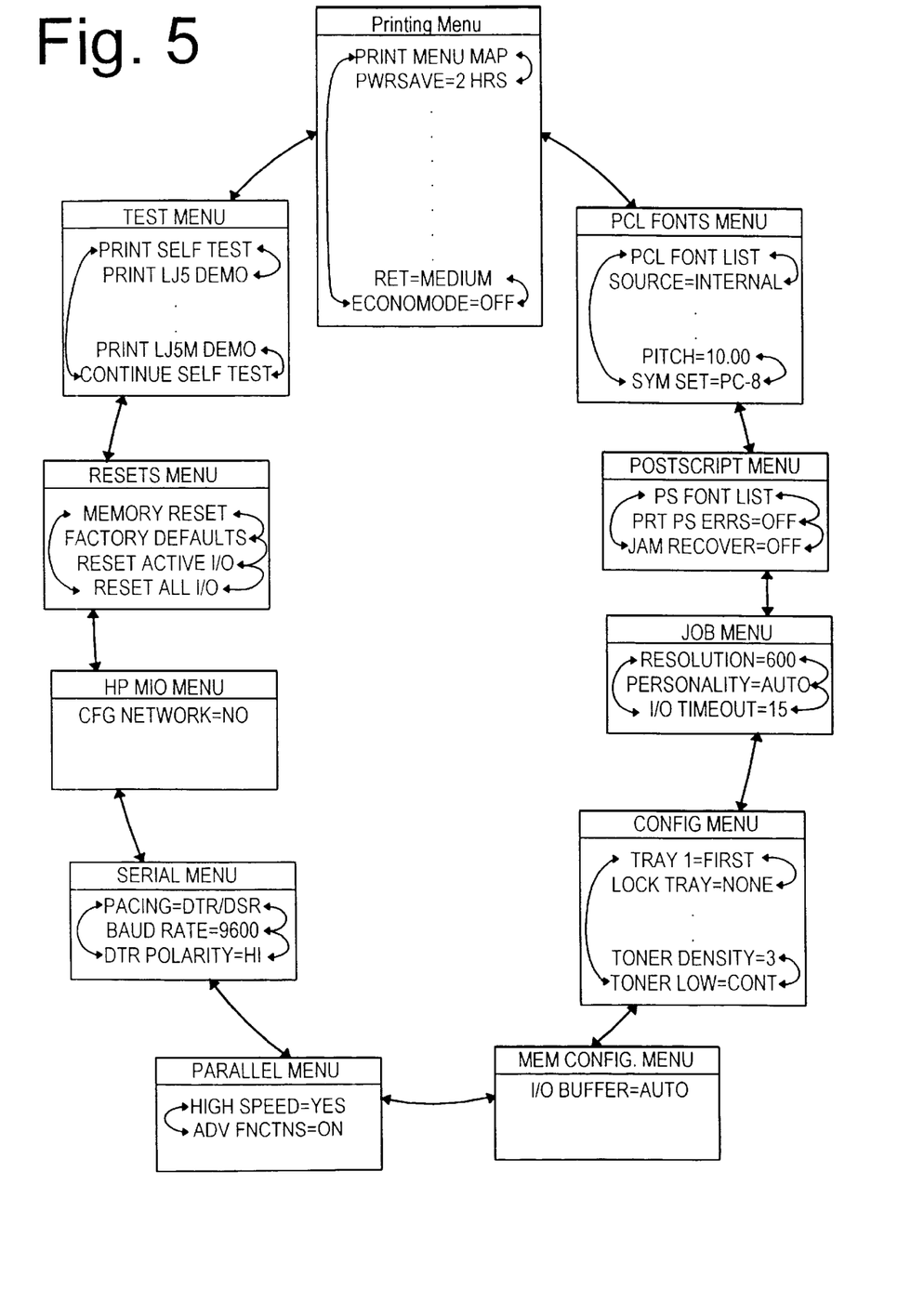
FIG. 5 is a flow diagram of one menu system controlled by the control panel.

The opposing ends of menu selector rocker switch 11 are provided with direction indicating indicia such as arrows or chevrons indicating forward and backward directions corresponding to the directions through which a user can traverse the menu hierarchy. Menu selector 11 represents a first hierarchical bidirectional selector in the sense that it allows the user to traverse the first level of the image forming device's feature selection menu system. When either end of menu selector switch 11 is depressed, control panel circuit 20 automatically places image forming device 100 in the off-line programming state, displays the first menu, which in the example of FIG. 5 is the printing menu, on alphanumeric display 17 and allows a user to advance through the various menus in both forward and backward, clockwise and counter-clockwise in the example, directions by additional depressions of either end of switch 11.

Similarly, the opposing ends of item selector rocker switch 12 are provided with direction indicating indicia to indicate the opposing directions through which the user can proceed through the item list within a given menu. Item selector 12 represents a second hierarchical bidirectional selector in the sense that it allows the user to traverse the second level of the image forming device's feature selection menu system, this level corresponding to the items within the menus of the first level. Control panel circuit 20 detects depressions of either end of item selector switch 12 and allows a user to proceed in both forward and backward directions through the list of items within a selected menu displayed on alphanumeric display 17. Value selector rocker switch 13 allows the user to increment or decrement the value of a menu item selected with item selector 12. Value selector 13 is a bi-directional increment and decrement selector in the sense that it allows a user to change the value of a particular item either up or down in given increments. The opposing ends of value selector switch 13 are provided with indicia indicating increment and decrement functions, such as the plus sign on one end and the minus sign on the other in the preferred embodiment. Control panel control circuit 20 detects a depression of either end of value selector switch 13 and increments or decrements the temporary register value of the selected menu item.

Once the new value has been entered using value selector switch 13, the user depresses select push-button 14 to permanently store the temporary register value in the item's register. Select push-button 14 is a momentary push-button switch in the preferred embodiment. This feature allows a user to save a desired value in memory for an item within a particular menu without returning to the on-line state so that additional changes can be made to items within the same or different menus.

Like select push-button 14, go or on-line switch 16 is also a momentary push-button switch in the preferred embodiment and allows a user to accomplish several functions. When image forming device 100 is in the on-line state, activation of go switch 16 will toggle the image forming device to the off-line state. When image forming device 100 is in the off-line/programming state, activation of go switch 16 allows image forming device 100 to reenter the on-line state after having entered the off-line state. In this preferred embodiment, activation of go switch 16 also clears clearable warnings displayed on display 17, acts as a form feed when data is present in image forming device 100 and toggles the image forming device from the power save mode to the normal on-line mode.

Similarly, job cancel switch 15 is, in the preferred embodiment, a momentary push-button switch which allows the user to cancel the current print job, stopping printing and clearing the print buffer(s) of data representing the canceled job. Job cancel selector is advantageously recessed within the surface of control panel 10 to inhibit inadvertent job cancellation, as is shown particularly in FIG. 4.

Control panel circuit 20 also detects activation of select switch 14, go switch 16 and job cancel switch 15 to track the states of the various registers, to update registers, to display the current state as well as the current selected item and/or menu on a visual indicator device such as alpha numeric display panel 17 and to communicate with print engine 30 of image forming device 100.

Figure 6:
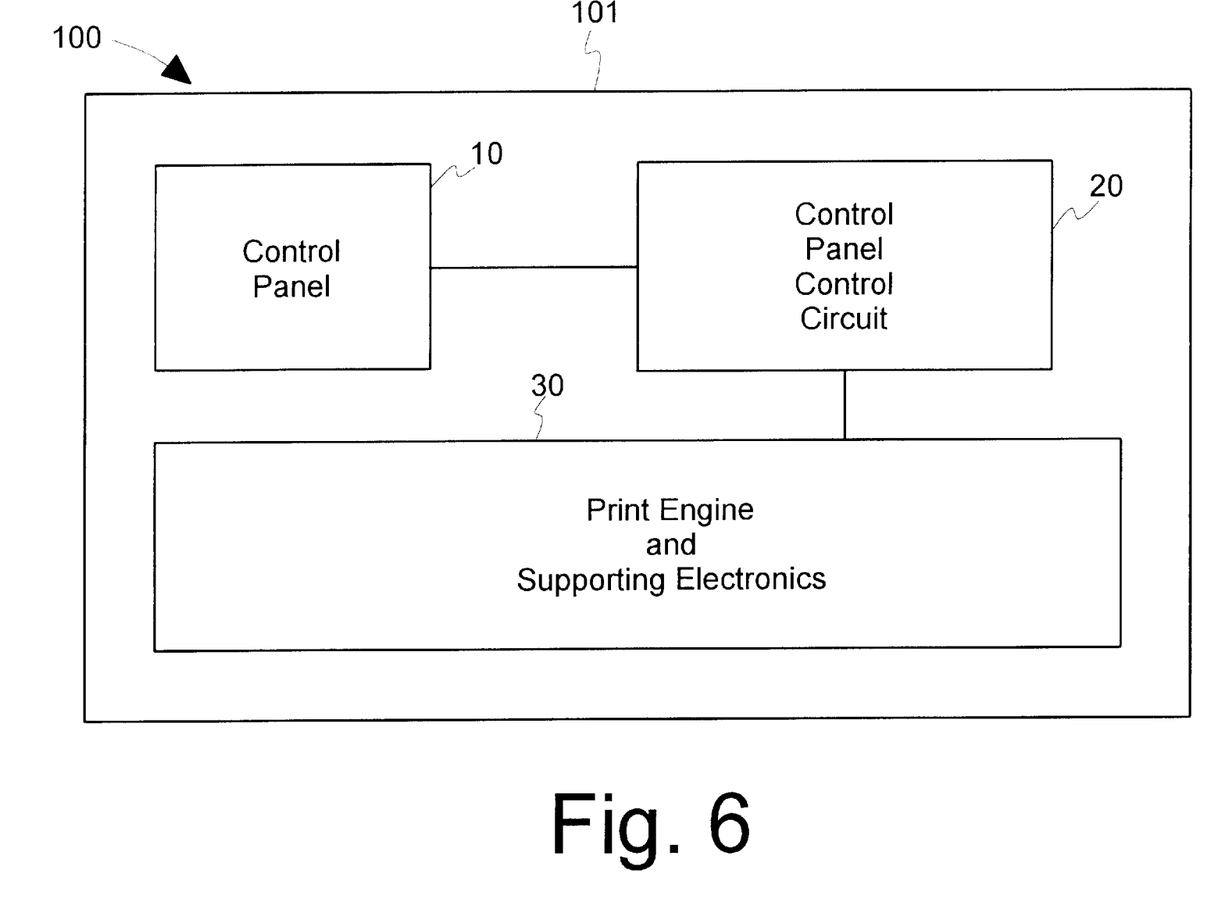
FIG. 6 is a block diagram schematic representation of an image forming device having the control panel incorporated therein.

While control panel control circuit 20 and print engine 30, including supporting electronics such as a formatter and a printer controller, are illustrated as separate entities within image forming device 100 shown in FIG. 6, it should be noted that one or more of these entities can, and likely are, integrated into a single entity. For example, in practicing the invention, control panel circuit 20, a formatter and a printer controller have been integrated into a single entity.

FIG. 6 illustrates an image forming device 100, such as a laser printer, having control panel 10 incorporated therein and operatively connected to control panel control circuit 20 and print engine 30, all within housing 101.

Other modifications include substituting other switches for the rocker switches of the invention, providing other menu hierarchies and other menu structures. For instance, a combination of two momentary push-button, cell, touch sensitive or similar switches can be substituted for a single rocker switch. A two position with neutral toggle or slide type switch could also be substituted for the rocker switches. Single cell type, touch sensitive or similar momentary switches can be substituted for the momentary push-button go and select switches. Additional indicators such as LEDs, liquid crystal displays, audio or other types of indicators can be used in addition to or in lieu of the alphanumeric display.

While there is shown and described the preferred embodiments of the invention, it is to be distinctly understood that this invention is not limited thereto but may be variously embodied to practice within the scope of the following claims. It will therefore be understood that modifications and variations are possible without departing from the scope of the invention as expressed in the following claims.

We claim:

1. A control panel for an image forming device which comprises:

a single first hierarchical level bi-directional selector;

a separate, single second hierarchical level bi-directional selector located below the first hierarchical level bi-directional selector;

a separate, single bi-directional value increment and decrement selector located below the second hierarchical level bi-directional selector;

a select switch located below the bi-directional value increment and decrement selector;

an on-line switch; and a control panel control circuit operatively connected to the first hierarchical level bi-directional selector, the second hierarchical level bi-directional selector, the bi-directional value increment and decrement selector, the select switch and the on-line switch.

2. The control panel of claim 1 further comprising a visual indicator device operatively connected to the control circuit.

3. The control panel of claim 2 wherein the first hierarchical level bi-directional selector, the second hierarchical level bi-directional selector, the bi-directional value increment and decrement selector are rocker switches.

4. The control panel of claim 3 wherein the first hierarchical level bi-directional rocker switch and the second hierarchical level bi-directional rocker switch each include direction indicating indicia located near opposing ends of the switches and the bi-directional value increment and decrement rocker switch has increment and decrement indicia located near opposing ends thereof.

5. The control panel of claim 1 wherein the first hierarchical level bi-directional selector, the second hierarchical level bi-directional selector, the bi-directional value increment and decrement selector are rocker switches.

6. The control panel of claim 5 wherein the first hierarchical level bi-directional rocker switch and the second hierarchical level bi-directional rocker switch each include direction indicating indicia located near opposing ends of the switches and the bidirectional value increment and decrement rocker switch has increment and decrement indicia located near opposing ends thereof.

7. The control panel of claim 1 further comprising:

a job cancel switch operatively connected to the control panel control circuit; and the control panel control circuit being configured to cancel any print job currently being printed in response to an activation of the job cancel switch.

8. The control panel of claim 2 further comprising:

a job cancel switch operatively connected to the control panel control circuit; and the control panel control circuit being configured to cancel any print job currently being printed in response to an activation of the job cancel switch.

9. The control panel of claim 4 further comprising:

a job cancel switch operatively connected to the control panel control circuit; and the control panel control circuit being configured to cancel any print job currently being printed in response to an activation of the job cancel switch.

10. The control panel of claim 6 further comprising:

a job cancel switch operatively connected to the control panel control circuit; and the control panel control circuit being configured to cancel any print job currently being printed in response to an activation of the job cancel switch.

11. An image forming device which comprises:

a housing;

a print engine within the housing;

a control panel control circuit within the housing and operatively attached to the print engine; and a control panel affixed to the housing, the control panel including:

a single first hierarchical level bi-directional selector operatively connected to the control panel control circuit;

a separate, single second hierarchical level bi-directional selector operatively connected to the control panel control circuit and located below the first hierarchical level bi-directional selector;

a separate, single bi-directional value increment and decrement selector operatively connected to the control panel control circuit and located below the second hierarchical level bi-directional selector;

a select switch operatively connected to the control panel control circuit and located below the bi-directional value increment and decrement selector; and an on-line switch operatively connected to the control panel control circuit.

12. The image forming device of claim 11 further comprising a visual indicator device affixed to the housing and operatively connected to the control circuit.

13. The image forming device of claim 12 wherein the first hierarchical level bi-directional selector, the second hierarchical level bi-directional selector, the bi-directional value increment and decrement selector are rocker switches.

14. The image forming device of claim 13 wherein the first hierarchical level bi-directional rocker switch and the second hierarchical level bi-directional rocker switch each include direction indicating indicia located near opposing ends of the switches and the bi-directional value increment and decrement rocker switch has increment and decrement indicia located near opposing ends thereof.

15. The image forming device of claim 11 wherein the first hierarchical level bi-directional selector, the second hierarchical level bi-directional selector, the bi-directional value increment and decrement selector are rocker switches.

16. The image forming device of claim 15 wherein the first hierarchical level bi-directional rocker switch and the second hierarchical level bi-directional rocker switch each include direction indicating indicia located near opposing ends of the switches and the bi-directional value increment and decrement rocker switch has increment and decrement indicia located near opposing ends thereof.

17. An image forming device which comprises:

a housing;

a print engine within the housing;

a control panel control circuit within the housing and operatively attached to the print engine;

a control panel affixed to the housing, the control panel including:

a single first hierarchical level bi-directional selector operatively connected to the control panel control circuit;

a separate, single second hierarchical level bi-directional selector operatively connected to the control panel control circuit and located below the first hierarchical level bi-directional selector;

a separate, single bi-directional value increment and decrement selector operatively connected to the control panel control circuit and located below the second hierarchical level bi-directional selector;

a select switch operatively connected to the control panel control circuit and located below the bi-directional value increment and decrement selector;

an on-line switch operatively connected to the control panel control circuit; and the control panel control circuit being configured to display on a visual indicator device a plurality of first hierarchical level indicia each indicating a separate menu in response to activation of the first hierarchical level selector, a plurality groups of second hierarchical level indicia each indicating a separate item within a group of items within a particular menu in response to activation of the second hierarchical level selector, incrementing and decrementing a temporary register value corresponding to an individual item value in response to activation of the value increment and decrement selector; to save the temporary register value to the print engine in response to an activation of the select switch, and to place the image forming device in an on-line state in response to an activation of the on-line switch.

18. The image forming device of claim 17 further comprising a visual indicator device affixed to the housing and operatively connected to the control circuit.

19. The image forming device of claim 18 wherein the first hierarchical level bi-directional selector, the second hierarchical level bi-directional selector, the bi-directional value increment and decrement selector are rocker switches.

20. The image forming device of claim 19 wherein the first hierarchical level bi-directional rocker switch and the second hierarchical level bi-directional rocker switch each include direction indicating indicia located near opposing ends of the switches and the bi-directional value increment and decrement rocker switch has increment and decrement indicia located near opposing ends thereof.

21. The image forming device of claim 17 wherein the first hierarchical level bi-directional selector, the second hierarchical level bi-directional selector, the bi-directional value increment and decrement selector are rocker switches.

22. The image forming device of claim 21 wherein the first hierarchical level bidirectional rocker switch and the second hierarchical level bi-directional rocker switch each include direction indicating indicia located near opposing ends of the switches and the bi-directional value increment and decrement rocker switch has increment and decrement indicia located near opposing ends thereof.

23. The image forming device of claim 17 further comprising:

a job cancel switch operatively connected to the control panel control circuit; and the control panel control circuit being configured to cancel any print job currently being printed in response to an activation of the job cancel switch.

24. The image forming device of claim 18 further comprising:

a job cancel switch operatively connected to the control panel control circuit; and the control panel control circuit being configured to cancel any print job currently being printed in response to an activation of the job cancel switch.

25. The image forming device of claim 20 further comprising:

a job cancel switch operatively connected to the control panel control circuit; and the control panel control circuit being configured to cancel any print job currently being printed in response to an activation of the job cancel switch.

26. The image forming device of claim 22 further comprising:

a job cancel switch operatively connected to the control panel control circuit; and the control panel control circuit being configured to cancel any print job currently being printed in response to an activation of the job cancel switch.

* * * * *